(12) United States Patent
Kiyak et al.

(10) Patent No.: US 10,862,749 B1
(45) Date of Patent: Dec. 8, 2020

(54) SYSTEMS FOR AND METHODS OF NETWORK MANAGEMENT AND VERIFICATION USING INTENT INFERENCE

(71) Applicant: Veriflow Systems, Inc., San Jose, CA (US)

(72) Inventors: Firat Kiyak, Champaign, IL (US); Giri Prashanth Subramanian, Champaign, IL (US); Sajid Awan, San Jose, CA (US); Matthew Chapman Caesar, Champaign, CA (US); Philip Brighten Godfrey, Champaign, IL (US); Matthew Paul Wycklendt, McFarland, WI (US)

(73) Assignee: VMware, Inc., Palo Alto, CA (US)

( * ) Notice: Subject to any disclaimer, the term of this patent is extended or adjusted under 35 U.S.C. 154(b) by 122 days.

(21) Appl. No.: 16/041,598

(22) Filed: Jul. 20, 2018

Related U.S. Application Data

(60) Provisional application No. 62/535,713, filed on Jul. 21, 2017.

(51) Int. Cl.
| | | |
|---|---|---|
| *H04L 12/24* | (2006.01) | |
| *H04L 12/707* | (2013.01) | |
| *H04L 12/723* | (2013.01) | |
| *G06N 20/00* | (2019.01) | |

(52) U.S. Cl.
CPC ...... *H04L 41/0813* (2013.01); *H04L 41/0893* (2013.01); *H04L 41/12* (2013.01); *H04L 41/145* (2013.01); *H04L 41/147* (2013.01); *H04L 41/22* (2013.01); *H04L 45/22* (2013.01); *H04L 45/50* (2013.01); *G06N 20/00* (2019.01)

(58) Field of Classification Search
CPC ... H04L 41/0813; H04L 41/22; H04L 41/145; H04L 41/12; H04L 41/0893; H04L 41/147; H04L 45/50; H04L 45/22; G06N 20/00
See application file for complete search history.

(56) References Cited

U.S. PATENT DOCUMENTS

| | | | | |
|---|---|---|---|---|
| 8,055,742 | B2 * | 11/2011 | Koops | H04L 41/5041 706/45 |
| 2014/0336836 | A1 * | 11/2014 | Borrett | G06Q 10/06 700/295 |
| 2015/0281105 | A1 * | 10/2015 | Vaderna | H04L 45/38 370/231 |

* cited by examiner

*Primary Examiner* — Michael C Lai
(74) *Attorney, Agent, or Firm* — Kim & Stewart LLP

(57) ABSTRACT

A system for managing a network using intent inference includes a network interface that is configured to obtain device information regarding a plurality of hardware devices within a data communication network. A processor is configured to infer intended packet handling behavior of a plurality of the devices. A network verification system models packet handling behavior of the devices within the network and compares the inferred intended behavior to the modeled packet handling behavior. The system can take action in response to the results of the comparison, which can include initiating a configuration change to one or more of the hardware devices of the data communication network.

48 Claims, 7 Drawing Sheets

SYSTEMS FOR AND METHODS OF NETWORK MANAGEMENT AND VERIFICATION USING INTENT INFERENCE

This application claims priority of U.S. Provisional Application No. 62/535,713, filed Jul. 21, 2017, the entire contents of which are hereby incorporated by reference.

BACKGROUND OF THE INVENTION

The present invention relates to the field of managing and verifying data communication networks. More particularly, the present invention relates to the field of managing and verifying data communication networks by inferring intended behavior of network devices.

Day-to-day operations of modern enterprises, government entities, and other organizations rely on computer networks—for storing and retrieving data from databases, enabling communication between employees, and providing services to customers, among many other needs. However, these networks have become increasingly more complex, and network administrators are subject to pressure to adapt such networks to sometimes rapidly changing business needs. To a significant extent, network management activities are carried out manually. In a complex, changing network environment (sometimes with thousands of changes per month), human factors, as well as software bugs, can lead to critical errors. Such errors can result in outages, performance degradation, unauthorized intrusions, vulnerabilities that can lead to leakage of sensitive information, and many other problems.

One general approach to identify such errors is to monitor data traffic as it flows through the network. The data packets' source and destination, header fields containing metadata, transit timing, transit path, and final disposition might be collected; or due to the high rate of data flow, typically a limited portion of such information for a sample of data flows over a limited time may be collected. This traffic data may then be analyzed to attempt to identify anomalies, such as service outages or exfiltration in a data breach. However, by its very nature of examining current or historical data packets, this approach only raises alerts after problems are already being experienced by users or security has already been breached.

Recently, the emerging field of network verification has applied mathematical processes analyze the correctness of data communication networks. Such network verification systems attempt to predict possible data flow behavior before it happens. This allows potential problems to be identified and corrected before they are experienced by users of the network.

U.S. Pat. No. 9,225,601 discloses a network-wide verification system that may be adapted with a data plane verification layer positioned between a set of multiple network devices and a controller in network communication with the devices, where the controller is configured to transmit packet-forwarding rules to the devices. This system addresses methods and systems to integrate with software-defined network controllers and data structures to perform efficient, real-time verification, among other things.

What are needed are improved systems and methods for network verification.

SUMMARY OF THE INVENTION

The present invention provides systems for and methods of network management and verification using intent inference. In accordance with an embodiment, a system for managing a network using intent inference is provided. A network interface is configured to obtain device information regarding a plurality of hardware devices within a data communication network. A processor is configured to infer intended packet handling behavior of a plurality of the devices. A network verification system models packet handling behavior of the devices within the network and compares the inferred intended behavior to the modeled packet handling behavior. The system can take action in response to the results of the comparison, which can include initiating a configuration change to one or more of the hardware devices of the data communication network.

This and other embodiments are described herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT OF THE INVENTION

Figure 1:
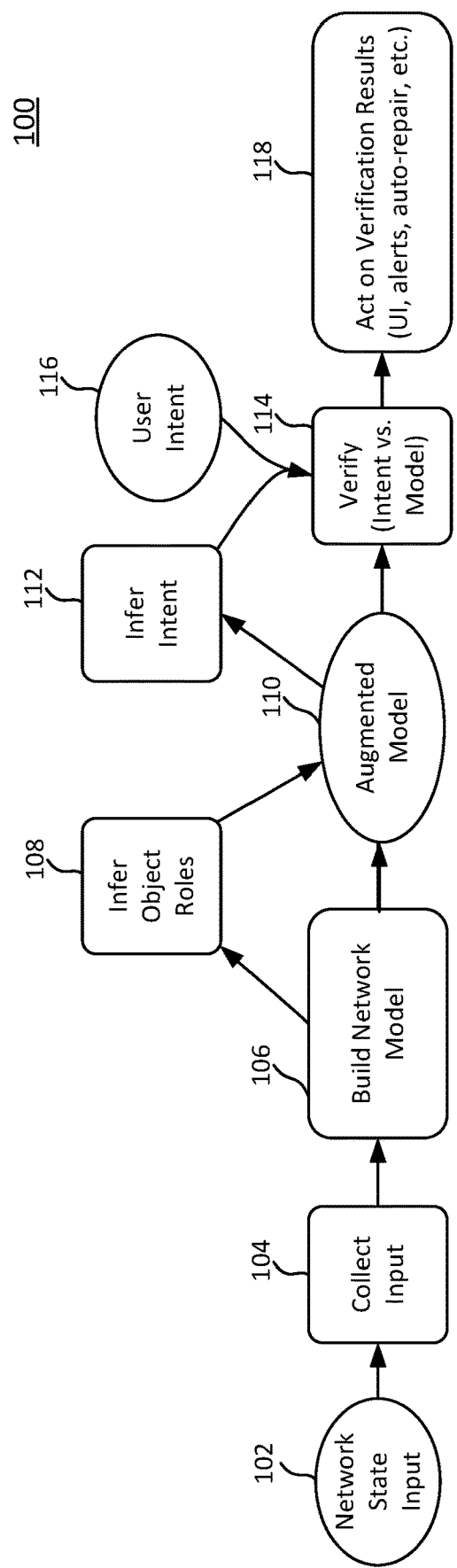
FIG. 1 illustrates a flow graph showing data flow and operation of a network management and a verification system in accordance with an embodiment of the present invention.

The present invention is directed toward systems for, and methods of, management and verification of data communication networks using intent inference. A data communication network includes network devices (also referred to as "objects") including, but not limited to, routers, switches, firewalls, load balancers, data storage devices, data terminals, servers, special-purpose devices, and so forth, as well as data communication links among the devices. The data communication links can be wired (e.g., Ethernet, USB, etc.), wireless (Wi-Fi, Bluetooth, radio, cellular, etc.) or a combination thereof and can perform communications in accordance with a variety of communication protocols (e.g., Ethernet, TCP/IP, etc.). Many network devices are configurable according to various packet handling rules and policies as well as other operational parameters. In fact, many network devices are themselves complex machines including, for example, controllers, software and/or firmware, internal communication buses and data storage including packet buffers as well as storage for software that controls operation of the device.

In general, a network verification system requires information regarding the functional behavior of the data communication network under consideration as well as information regarding the intended behavior of the network. The verification process uses this information to compare the functional behavior to the intended behavior. Results of this comparison can be used to determine whether the data communication network is correctly configured and to identify potential problems with the data communication network. If potential problems are identified, they can be addressed by making changes to the configuration of the network, including making changes to the configuration of one or more of the devices within the network.

Such a network verification system is useful in the management of data communication networks, for example, for verifying that networks are performing as intended, for troubleshooting existing networks and for determining whether proposed changes to a network will create potential problems before the proposed changes are deployed.

The verification process can be challenging. For example, due to computational performance requirements, as well as the number and diversity of devices within the network, it can be difficult to obtain information needed to perform verification. Information regarding the functional behavior of the data communication network under consideration may be obtained by gathering information from the network devices themselves, from configurations of these devices stored separately from the devices (e.g. in a network control center) and/or by monitoring their behavior.

Information regarding intended behavior of the data communication network can be difficult to obtain as well. The intended behavior of the network (or more simply "intent") refers to the behavior, functionality and capabilities of the network which are intended by a user. In other words, the intended behavior is how the network should function. Users who might have intent as to the behavior of the network can include a network administrator, architect, owner, or operator of the network.

The following are examples of intent on the form of statements or rules:

"Servers in the data center should have two independent network paths via which they can communicate with Internet providers."

"All wireless access points should be able to access the Internet."

"Automatic Teller Machines (ATMs) should only be accessible from secure zones within data centers."

While these statements appear straightforward, obtaining the intent may be challenging for multiple reasons. The user of the network verification system may need to learn a machine-recognizable way of describing intent, since natural language (as in the intent examples above) is typically not accepted as input since it is imprecise and difficult for machines to read. In the examples above, the user would need to particularly identify the mentioned "data centers," "secure zones", "Internet providers", and "ATMs". And, even if the user knows how to describe the intent, the network may be very large and have many goals, such that it could take significant time to enter all intent statements which may number in the hundreds or thousands. Finally, the user may not be aware what the intent is, for example, because the user lacks sufficient experience or knowledge, or the original architects of the network may no longer be available (e.g. after a change of staff or a merger between firms) and/or documentation may be inadequate. Further, contextual information, like grouping of devices into zones, may be written in hand-drawn diagrams but not available in machine-readable form.

The inventors have designed and built a network verification system that addresses many aspects of this challenge by inferring intent. That is, instead of requiring that the user explicitly specify intent, the system determines (i.e. infers) intent or possible intent from other data sources with reduced input from the user, or no input from the user. The present invention, described in this disclosure, can be implemented within a network verification system, such as is described in U.S. Pat. No. 9,225,601, entitled "Network-Wide Verification of Invariants," the entire content of which is hereby incorporated by reference.

The present invention may be used to augment an existing network verification system with modules that reconstruct or infer various kinds of input data based on information obtained from alternative sources.

FIG. 1 illustrates a flow graph 100 showing data flow and operation of a network management system in accordance with an embodiment of the present invention. As shown in FIG. 1, network state information 102 is input to the system. The network state information 102 includes information regarding the functional behavior of the data communication network under consideration and can include, for example, identification of devices in the network, configuration information for the devices in the network and information regarding communication links in the network. This information is collected in step 104. Using this information, a base model of the network is constructed in step 106. This models functional behavior of the network. In step 108, roles of devices in the network are inferred. In the step 108, physical and abstract objects in the network are identified and labeled. The output of this stage is a set of labels associated with objects, which can be combined with the base network model to produce an augmented model.

In step 110, the model is augmented using the inferred device roles. In step 112, intended behavior of the network is inferred. In this step 112, intended functionality of the network or parts thereof, which can be through reference to objects labeled by the previous stage, is inferred. The output of the step 112 is a set of rules specifying the intent.

In step 114, verification is performed in which the functional behavior determined from the model is compared to the inferred intended behavior. User intent 116 can also be provided so that the verification compares the functional behavior of the network to the intended behavior where the intended behavior includes both inferred intended behavior and actual intended behavior as expressed by the user. In step 118, results of the verification are acted upon. This can include invoking additional applications that perform functions including automatically reconfiguring one or more devices in the network, displaying a visualization of the results to a user-interface, sending an alert message to a network administrator, auto-triggering custom actions, and so forth.

Thus, an intent inference system may be described in two principal stages, namely, the step 108 (infer roles) and the step 112 (infer intent). This can also include applying the results to perform verification in the step 114. Informally, the two stages respectively infer what the objects in the network are, and how they should behave or interact with each other.

As an example, the first stage may identify objects in the network like "server", "data center", "Internet provider uplink", and "ATM". The second stage can then utilize these objects. For example, it can check whether a data center exists, and if so, compose an intent rule such as "Servers in the data center should have two independent network paths via which they can communicate with Internet providers" in a format that is understandable by the verification process applied in step 114.

An important aspect of this system is that it addresses the significant challenges that result from requiring that the user specify intent, because intent is, in whole or part, determined automatically. Thus, in a preferred embodiment, the steps 108 and 112 are performed programmatically, meaning that they are performed by a machine executing computer executable code. In addition, other steps, including steps 104, 106, 110, 114 and 118 can be performed programmatically. Step 106 can employ known network modeling methods, while step 114 can employ known network verification methods.

It should be noted that in a particular system either of the stage of inferring roles and/or the stage of inferring intent can be omitted. For example, if only the object role inference stage is present, no intent rules will be created but the objects identified can be used in other parts of the system, such as to visualize the location of objects. If only the intent inference stage is present, it may create intent rules that do not require inferring roles. Moreover, these stages may be combined: a single software module could perform any role inference necessary to create a particular intent rule or rules.

The system may also accept user input in numerous ways. For example, it may accept user-specified intent rules in addition to inferred rules; some aspects of intent inference may require user input (ideally to a limited degree); and inferred intent rules may be subsequently customized by the user (such as adjusting parameters or removing an inferred intent rule entirely).

Figure 2:
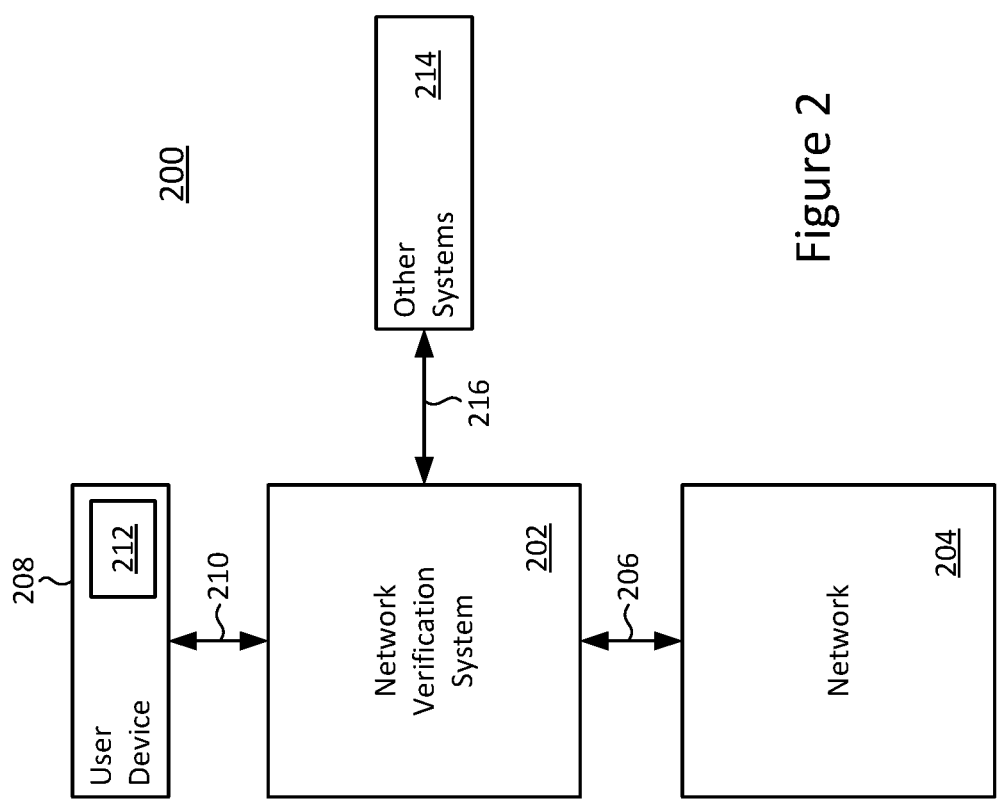
FIG. 2 illustrates a network management and verification system in accordance with an embodiment of the present invention.

FIG. 2 illustrates a network management system 200 in accordance with an embodiment of the present invention. As shown in FIG. 2, a network verification system 202 can be communicatively coupled to a network 204 under management via a network interface 206. The network 204 can include network devices as well as communication links among the devices. The network verification system 202 can also be communicatively coupled to a user device 208 via an interface 210. The user device 208 can include a display 212 for displaying visualizations of results obtained by the network verification system 202. The network verification system 202 can also be communicatively coupled to other systems 214 via an interface 216.

The network verification system 202 can include a processor and data storage, as well as other elements, as shown and described in connection with FIG. 7. The network verification system 202 may perform some or all of the steps shown and described in connection with in FIG. 1. Thus, the network verification system 202 can obtain information (step 104) from devices of the network 204 via the interface 206. For example, the system 202 can send queries to individual devices in the network 204 and receive responses to those inquiries. Such queries may request the devices to provide reports on their configuration or internal state such as forwarding tables. The system 202 may also obtain information from the network 204 by monitoring packet handling behavior of devices within the network 204. The network verification system 202 can also obtain information (step 104) regarding devices of the network 204 via the interface 216. In this case, the other systems 214 accessed may include a network controller or other data repository that stores configuration information and possibly other information (e.g., forwarding rules, etc.) regarding the network 204 and its devices. The network verification system 202 may also perform steps of building the base model (step 106), augmenting the model (step 110) as well as inferring object roles (step 108), inferring intent (step 110), performing network verification (step 114) and acting on those results (step 118). For example, results of the verification can be provided to the user device 108 via the interface 210 and displayed by the display 212.

Figure 3:
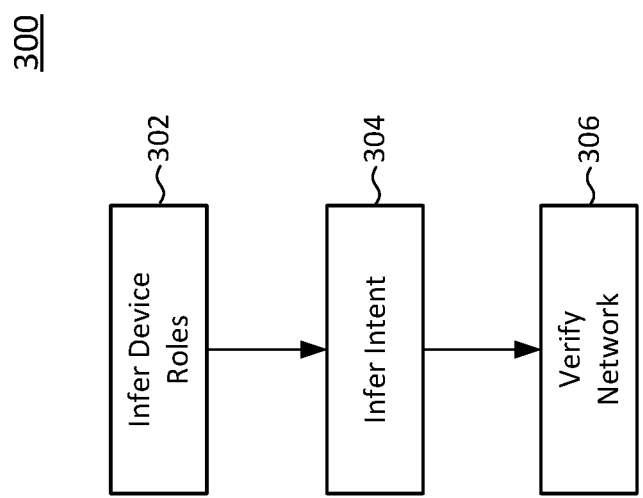
FIG. 3 illustrates a flow chart showing a method of network management and verification in accordance with an embodiment of the present invention.

FIG. 3 illustrates a flow chart showing a method 300 of network verification in accordance with an embodiment of the present invention. The method 300 can be performed using the system 200 of FIG. 2. In step 302, roles of devices in the network are inferred. In step 304, intent is inferred. Then, in step 306 verification of the network is performed using results of the step 304. The steps 302-306 are described in more detail herein.

Inferring Object Roles

The term "object" as used herein refers to any component of the network, or group of components. An object may be a physical device like a firewall, router, load balancer, etc., an interface or communication port on a device, virtual equipment like a virtual switch used to direct traffic among virtual machines; or a set of objects such as devices that have interrelated functionality.

The role of an object is, broadly speaking, the functionality of the object within the network architecture (as intended by the network architect or operator). For example, certain network routers may have a "core router" role, which in typical network engineering terminology indicates that the device is positioned between part of the enterprise network (like a data center) and uplinks to a wide-area network or the public Internet, and carries traffic between them using Internet Protocol (IP) routing.

The system may use information in the collected network state to infer roles of objects in the network. To accomplish this, the system may contain a collection of modules (or other means of computer-readable instructions) for inferring roles. Each module may focus on inferring a particular role or related roles, and many or all inference modules may be applied to a network (e.g. serially or in parallel) so that the roles of multiple types of objects are inferred.

The collection of role inference modules may be extensible; that is, the system contains a framework so modules may be added which either infer more information, or infer similar information in different ways, and improved across time. The system may also be customizable so users can add their own inference rules.

Figure 4:
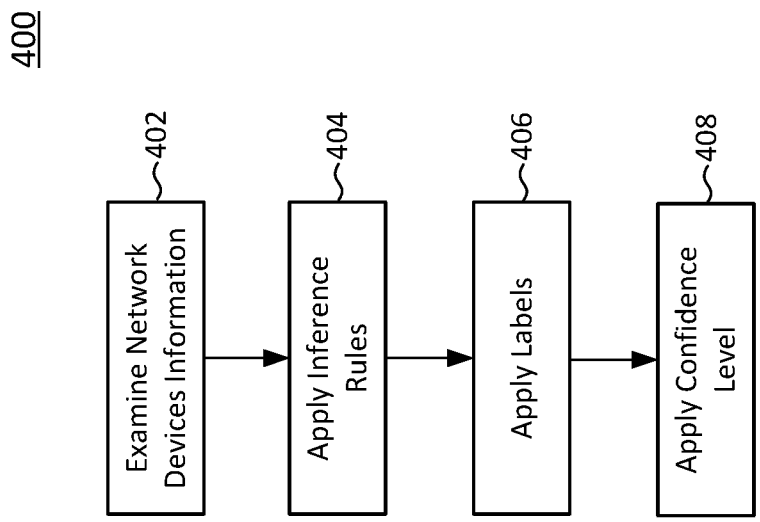
FIG. 4 illustrates a flow chart showing a method of inferring network device roles in accordance with an embodiment of the present invention.

FIG. 4 illustrates a flow chart showing a method 400 of inferring network device roles in accordance with an embodiment of the present invention. The method 400 of FIG. 4 can be performed in the step 302 of FIG. 3 and/or in the step 108 of FIG. 1. Each individual role inference module may perform some or all of the steps of the method 400. As shown in FIG. 4, step 402 involves examining objects and information about them collected from the network, along with auxiliary data sources. Step 404 involves applying inference rules to determine the roles of a subset of objects in the network. Step 406 involves creating (zero or more) labels associating objects or groups of objects with those identified roles. The term "label" as used herein refers to any identifier for the role. The role inference modules may store these label-object associations in a relational database or other storage medium for use by other parts of the verification system. Step 408 involves associating a numerical confidence level with labels.

The above outlines a general procedure that may be common to many role inference modules. In what follows, we describe multiple example inference modules which exhibit different embodiments of the above four steps— different data sources (e.g. information in the network model, output of monitoring commands run on a device, samples of network data traffic that has flowed through the system, etc.); different inference rules; different resulting labels; and different methods of assigning confidence.

Multi-Tier Data Center Role Inference

Figure 5:
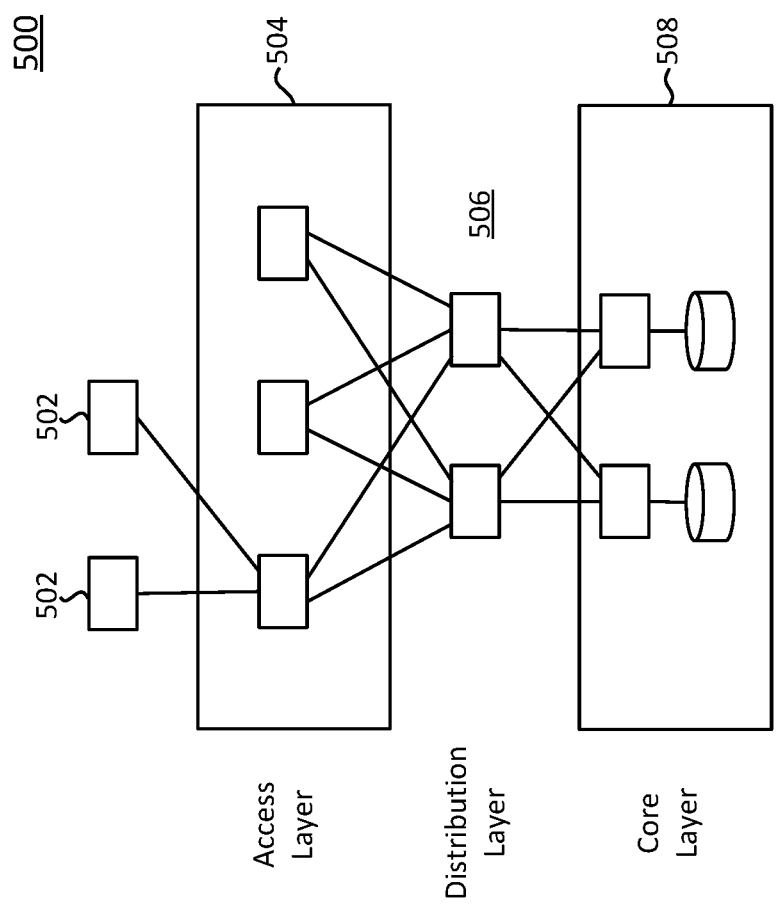
FIG. 5 illustrates an enterprise data center upon which network verification is performed in accordance with an embodiment of the present invention.

This module infers a collection of roles related to a common layered data center architecture. Enterprise data centers often follow a common pattern of network structure, as illustrated in FIG. 5. FIG. 5 illustrates an enterprise data center 500 upon which network verification is performed in accordance with an embodiment of the present invention. As shown in FIG. 5, the data center 500 can include access devices 502 which can be user access devices such as data terminals or personal computers. Access devices are devices in a network that provide access to the users of the network. The data center 500 can include an access layer 504, which can include, for example, servers, mass storage systems, and user access port devices. The data center 500 can also include a distribution layer 506 which can include distribution devices. Distribution devices are usually one level above the access devices and are typically used to aggregate all the traffic coming from the different access devices and further deciding what to do with the traffic. They usually operate on both layer 2 and layer 3 of the OSI model. Distribution devices can be, for example, switches that aggregate network traffic from the access layer 504. The data center 500 can also include a core layer 508 which can include, for example, high-speed switches and routers.

Here we describe steps to identify object roles in a multi-tier data center role inference module. Initially, all interfaces in the network are categorized. This can include identifying and labeling interfaces as access, trunk, management, L3 routed, virtual and subinterface:

Identify and label access interfaces. These may be identified as interfaces that are configured as a layer-2 Ethernet port set to use "access mode". Access interfaces are physical ports and are typically used to connect directly to servers, user workstations, and other end-hosts. The procedure preferably only examines interfaces which have both their admin state and their protocol state set to "up", in order to identify the role that the device is currently playing in the network, rather than what it is capable of doing.

Identify and label trunk interfaces. "Trunk interface" refers to a particular type of interface in the network, which carries traffic with multiple VLAN tags. There are typically three kinds of interfaces, namely, access, trunk and L3. Access interfaces as defined above work with 1 VLAN tag, trunk interfaces work with multiple VLAN tags, and L3 interfaces don't work with VLAN tags at all, as they are layer 3 interfaces, whereas VLAN tags refer to layer 2. Trunk interfaces may be identified as interfaces that are configured on a device as "trunk mode" interfaces and which may be configured to carry traffic for multiple VLANs (virtual local area networks).

Identify and label management interfaces. Management interfaces are used to manage the device, like setting it up, defining its protocols and so forth. Devices typically use a different naming convention to differentiate management interfaces from other interfaces on the device. One way to identify management interfaces is by looking at well-known short names used on different device types. For instance, many Juniper devices use me0 short name, and Cisco Nexus devices use mgmt0 short name. In addition, this module can look at remote access protocols and identify those interfaces which allow remote access using SSH, Telnet, or HTTP in their configuration.

Identify and label L3 interfaces. These are identified as interfaces configured to forward traffic based on Internet Protocol (IP) headers. For this, the module preferably checks both physical interfaces as well as the subinterfaces that have been configured on this device.

Identify and label the type of some or all devices in the network. Specifically, this can include categorizing devices as L2 switches, L3 switches, routers, firewalls, load balancers, OpenFlow devices, wireless controllers and fabric extenders (FEXes), and so forth. The module could identify and label devices of other types. In order to do this, for each device, the module looks at the identified types of all the interfaces on that device and the protocols that have been enabled on it, as follows:

If the device only contains L2 interfaces (either access or trunk) and management interfaces, then the device is classified as an L2 switch. (We allow inclusion of L3 management interfaces because devices are usually connected to a separate management network.)

If the device only contains L3 interfaces and management interfaces, then the device is labelled as a router.

If the device has a mix of layer 2 and layer 3 interfaces, and additionally, either has multiple VLANs configured on it or has a redundancy protocol enabled (such as VRRP or HSRP), then it is labeled as an L3 switch. VRRP refers to Virtual Router Redundancy Protocol which is a networking redundancy protocol that provides for automatic assignment of available Internet Protocol (IP) routers to participating hosts. HSRP refers to Hot Standby Router Protocol, which is also a networking redundancy protocol. Another example of a networking redundancy protocol is virtual PortChannel (vPC).

If the device has all L3 interfaces, but also has firewall policies enabled on it, then the device is labelled as a firewall.

If the device has wireless LANs configured on it, then it is labelled as a wireless controller. Additionally, certain device models are built as wireless LAN controllers, so the device is also labelled a wireless LAN controller device if its vendor and model match certain device types.

If the device has virtual servers configured, then it is labelled as a load balancer.

If the device has OpenFlow rules and interfaces, then it is labelled as an OpenFlow device.

If the device has neither routing nor switching enabled, nor is it an OpenFlow device, and configuration settings indicate it is managed by a parent device, then it is labelled as a FEX device.

Identify and label access devices. Once the module has figured out the type of the device by looking into the configuration of each device individually, it starts looking at the network as a whole in order to identify the role that a device plays in that network. If a particular device is labeled as an L2 switch, it has at least one interface labeled as an access interface and it only connects to other devices labeled as L2 switches or L3 switches in the network, then it is labelled as an access device. We prefer not to check the model of the device or the manufacturer here (though this could be done), because we want to keep the inference semantics agnostic of such facts and only rely on the role that the device is playing in the network.

Identify and label access layers. A layer is defined here as a set of devices all labeled with a common role (access, distribution, or core) and which are all connected to an overlapping set of devices on other layers. More specifically, these groupings can be created as follows, for each layer type:

Let C represent the set of all access devices that were identified in the manner described above.

Create an abstract network G which restricts the broader network being modeled to include only devices in C, devices directly connected to at least one device in C, and links between those devices.

Run a graph partitioning algorithm on G to split it into maximally connected components.

For each resulting connected component, let L be the devices in that component and also in C. Create the layer L and label it as access layer and store this information in the database. Note that this involves creating a new object (representing the set L) and also labeling that object (as an access layer set of devices).

Identify all other layers in the network.

Get the set of devices directly connected to the already-identified access layers but not belonging to any other access layer. Create a layer containing all these devices, but do not label the layer yet.

From these new unlabelled layers identified, get the next set of devices that are directly connected to this layer and not belonging to any other existing layer. Repeat this with successive new (as yet unlabeled) layers till each device in the network is assigned to a particular layer.

Split each layer identified above by the type of the devices in the layer. For example, if a particular layer identified has two L3 switches and one router, then split this layer into two layers, one layer containing the two L3 switches and another layer containing the one router.

Label unlabelled layers from the previous step. Note that the procedure only labels the layers that have not already been labelled, i.e., non-access layers.

If the layer contains L2 switches, L3 switches or firewalls, then the layer is labelled as an aggregation layer. Note that there can be multiple such aggregation layers between any access layer and core layer (as defined below).

If the layer contains routers, then the layer is labelled as a core layer.

Other layers are labeled as an unknown layer.

Identify and label a redundancy group for each set of two or more objects which have a networking feature configured where redundancy among them is part of the configured state. A redundancy group is a coordinated group of devices which are running a redundancy protocol such as HSRP or VRRP/vPC. Like a layer, a redundancy group is a stored object which represents a set of devices. For instance, Hot Standby Routing Protocol (HSRP) master and standby devices all have one or more HSRP group identifiers with references to each other via IP addresses. Therefore, devices that match the criteria that they have the same configured virtual IP, VLAN ID and HSRP identifier can be inferred to form an HSRP group. These devices can be placed in a new group object and the redundancy group label attached to that object. In addition, a more specific HSRP group label may be applied to the same object. Next, the module can assign a confidence score. Typically, an HSRP group contains only two devices; if more than two match these criteria, then it may indicate that they are not actually an active redundancy group (e.g., one device may have been decommissioned but is still being monitored); therefore, if there are more than two devices in a single HSRP group, the module can attach a low numerical confidence to the labeling. Otherwise, if there are exactly two devices, a higher numerical confidence can be attached.

Virtual port channel (vPC) pairs have a peer link between them connected from downstream devices over a single port-channel, and can form a redundancy group and can also be given a more specific vPC group label.

Two Cisco ASA devices which are configured in multi-context mode can be configured in "active-active" or "active-standby" failover modes, whereby a set of "security contexts" on the device are associated by the device's configuration to be in a single failover group. These devices can be placed into a redundancy group, and a redundancy group label may be applied to that newly created group object.

Identify and label internet-facing interfaces. These are the physical ports (also referred to as interfaces) on the routers/firewalls which are at the edge of a network. Traffic to and from the network usually flows to the internet through these ports. To find these, the module can search each interface in each device in the network, looking for the following characteristics: (1) traffic to external destinations, like the IP address 8.8.8.8, is forwarded out the interface; (2) the interface is connected to a device outside the scope of the network that the network verification system is directly monitoring; (3) the interface's device is running the BGP protocol and has a BGP peering session configured such that it will communicate out this interface; (4) furthermore, that BGP session has received route advertisements from an AS external to the local organization. In general, an internet-facing interface may have many, but not all of these properties. The interfaces which satisfy at least 3 of these properties may be labeled as internet-facing, and the system can associate a confidence level with the labeling based on the number of satisfied properties.

Leaf-Spine Cluster Role Inference

Some more modern compute clusters in data centers are connected and organized in what is known as "leaf-spine" architecture. This module can infer such a structure as follows:

Identify and label leaf devices. These are identified as devices that have a majority of their interfaces labeled as access interfaces, but the device may also contain L3 routed interfaces and typically is configured to route L3 traffic and is running a routing protocol such as OSPF, IS-IS or BGP.

Identify and label spine devices. These are identified as devices that lack access interfaces, are connected directly to multiple leaf devices, and are configured to run the same routing protocol as those devices.

Identify and label leaf layers and spine layers, following the general procedure for layers in the previous module.

Inferring Roles from Traffic

The modules described above infer object roles by examining what we can call "directly monitored state", for example, interface configurations on a router obtained by accessing the device via SSH, logging in with appropriate access credentials, and obtaining the output of monitoring commands.

Object role inference modules may also use knowledge of traffic flowing through the network to infer roles of devices.

This may be useful because:
  Directly monitored state may not be available. Traffic to or from a device may be observed in a location distant from a device, without directly monitoring it, yet still reveals information about it.
  Even if directly monitored state is available, traffic can provide complementary information.

Such modules must first obtain logs or samples of network traffic, or metadata from fields in packet headers (e.g., source IP, destination IP, transport protocol, transport port number, etc.). This information is readily available in enterprise networks. For example, the NetFlow protocol can be used to obtain packet header samples from Cisco devices; and many enterprises have databases or other existing systems where monitored traffic is stored.

Next, the module can examine the type of observed traffic to infer object roles and their location. Consider the goal of inferring objects in a financial network. The ISO 8583 protocol is used by ATMs to communicate with card issuing systems which inspect the card holder's account. If packet headers are inspected and this protocol is observed, then it can be inferred that the communicating parties are an ATM and a card issuing system, and the source and destination addresses of this packet can be used to infer their locations in the network. Then, these objects can be labeled as "ATM" or "card issuing system" respectively (or router/switch interfaces directly attached to them can be labeled as connecting to these objects).

As a second example, consider the goal of locating critical Oracle databases. A list of such servers may sometimes be available, but it may be somewhat inaccurate (due to poor record-keeping, lack of central control, etc.) or may be inconvenient to supply this list to the network verification system. Instead, the network verification system can employ its samples of traffic to infer server locations. TCP and UDP port number 2483 and 2484 are used by Oracle database servers "listening" for incoming connections. If packets are observed with these numbers in the transport protocol header's port field in a sampled packet, it can be observed that the source of the traffic is a client and the destination is an Oracle database server. The packet's destination IP address then gives the location of the server. The server (or router/switch interfaces directly attached to it) may be given a generic label such as "Server" or "Internal Server", as well as perhaps a more specific additional label such as "Oracle server".

Inferring Regions

Networks are often organized into hierarchical groupings which we refer to as regions. For example, at the highest level, an enterprise network may contain a campus in New York, a campus in San Jose, and a set of devices forming a wide-area network. Each of these three may be grouped into a region. Within the New York region, there may be a production data center and a laboratory network, each forming a region. Within the data center, there may be a number of clusters. Such regions can provide conceptual or architectural context for network engineers.

The network verification system may infer regions through a collection of region inference modules that observe traffic, similar to the modules above. For example, a module may:
  Group devices into a region based on common substrings in hostnames. This is possible because many enterprise networks choose regular formats for the hostnames of network devices, indicating the device's location and role.
  Group devices into a region based on network round-trip time (RTT) between devices, observed via pings, traceroutes, or other timing methods, by using an algorithm to cluster together devices which are physically nearby and separate devices at different sites.
  Group devices into a region which all participate in (1) a single broadcast domain, i.e., a group of devices where a layer-2 Ethernet broadcast packet injected at one location will be delivered to all devices in the group, or (2) a single L3 subnet, i.e., a single IPv4 or IPv6 broadcast domain.
  Group devices based on network reachability, for example as it relates to security. For example, devices which can reach each other without traversing a firewall may be in a single region. Or, group devices whose connectivity to the Internet traverses a firewall interface which is configured with the same security zone setting. "Reachability" refers to whether specified network traffic from a device can be delivered to another device via the network. I.e. "Can network traffic from device A reach device B through the network?" This can be made arbitrarily specific: "Is there reachability from device A to device B with source IP address 10.0.0.1 and VLAN tag 10", which implies, "Can network traffic with source IP address 10.0.0.1 and VLAN tag 10 from device A reach device B through the network?"
  Group devices which have tightly coordinated functions, such as an HSRP or vPC (master, backup) pair.
  Group devices based on inferred layers. In particular: (1) Place each access layer in a region. (2) Iteratively consider layers "above" the access layer that are increasingly close to the core layers. For each such layer L that is directly attached to devices in a set S of already-created layer regions, create a new region containing the devices in L and the regions in S. (3) Once core layers are reached, stop the process.

The system may use the above or other region inference modules in concert, by:
  Nesting the regions hierarchically, so that if region A contains a superset of the devices of region B, then the devices of region B will be placed in region B and region B will be placed inside region A (rather than the devices of region B being placed directly in region A).
  Combining the results of the above region inference modules to determine which groupings are most correct. For example, each inferred grouping above can be interpreted as increasing a numerical strength of association between its constituents, and then a cluster partitioning algorithm can be run to split the network into strongly-associated components.
  Offering multiple, potentially conflicting, hierarchies of regions to the user as alternatives. For example, the user may switch between different visualizations based on the region hierarchies.

Machine Learning-Based Role Inference

The above example modules employ inference rules that are essentially hand-written by experts. A key challenge is that in some cases, the role of a device might not conform precisely to such rules, due to complexity in the network, mistakes, unusual design decisions and so on. One approach to deal with the lack of clear-cut rules is to use multiple characteristics, voting, and confidence levels, as described above.

An approach that can provide increased robustness may employ machine learning. Specifically, a machine learning model can be used to accept objects as input and produce a labeling of the objects' roles. Framed as a supervised classification problem, this approach may involve the following steps:

Feature extraction: The system includes functions which can extract features from objects. Each feature is a characteristic of an object which may be potentially significant in determining its role. Examples of features include: device manufacturer, a Boolean variable representing whether layer-3 routing is enabled, a Boolean variable representing whether HSRP is enabled, routing table size, number of interfaces, speed of those interfaces (1 gigabit per second, 10 gigabits per second, etc.), whether the device has active BGP peerings to devices outside the network, and so on. The label output of any other inference module, such as those described above, may also be taken as a feature (intuitively, a module can be seen as "offering an opinion" which a machine learning algorithm can consider). Features would be selected that empirically result in effective classification in later steps.

Gathering training data: Prior to deployment, training data is assembled. Training data consists of data collected from multiple networks along with desirable labelings of objects in those networks. This may be obtained, for example, from networks labeled manually, from networks labeled by other users, or from networks initially labeled by automated object inference modules such as those above with subsequent adjustment by users.

Training a classifier: The system includes a classification algorithm, such as a decision tree or a neural network. Such a classifier can be trained using standard training algorithms by supplying the feature extraction functions from step 1 and the training data from step 2. While any classification algorithm may be employed, one advantage held by decision trees is that the user can be informed of the reason a certain object was classified with a certain label (by examining the trained decision tree).

Running the system: When deployed in a user's network, the role inference module observes collected state from the network, applies the feature extraction functions to obtain features of objects in the network, and feeds the resulting information into the trained classifier to finally result in an association between objects and role labels. The learning algorithm may supply a confidence (such as an estimated probability of calculation) which the system can use as a numerical confidence level associated with the labeling. The system may also offer the opportunity for the user to correct inferences. These can be fed as training data into step 2 to improve subsequent runs of the system. The system may also provide an option to share this feedback with a cloud-based service that can improve accuracy for other users as well.

A second approach to using machine learning methods involves unsupervised learning. In this method, no training data is employed. For example, a clustering algorithm can be applied directly to collected network state and a network model in order to group objects into regions.

Obtaining Roles from External Sources

Although the broad goal of the system described here is to operate autonomously, it is also valuable to provide a mechanism for external input to augment inferred roles, or even to replace inferred roles (while still utilizing inferred intent and other stages of the system). In particular, the system may be configured to:

Accept labels supplied by users (e.g., through a graphical user interface or via an API). This may be useful to override errors or add roles that other modules do not automatically infer. As an example, the system may allow the user to explicitly label private server interfaces, which connect to servers whose role is to be used within the enterprise only.

Accept labels supplied by an external program, through appropriate calls to the verification system's API. For example, some enterprises assign names to devices using a format which encodes their role. This format may be standardized within the enterprise, but unique to the enterprise, so that roles could be extracted from device names with a custom-written program.

Import labels from an external database. For example, the user may have a database of assets together with metadata that can directly (or with minimal transformation) be translated to object labels. This database could be an SQL database containing one entry per device, labeled with its role (desk phone, router, switch, firewall, etc.).

Like inferred role information, this configured information may be utilized by the system in later stages, such as for visualization or to infer and verify intent.

Inferring Intent

The verification system next may use the inferred object roles and object groups, along with potentially additional information, in order to infer intent. Here, intent refers to the behavior or configuration of the network (or parts thereof) as intended by operators or architects of the network. Intent is a description of what should happen which may then be compared with the network verification system's model of what can happen.

Similar to inferring roles, the system contains a collection of modules (or other means of computer-readable instructions) for inferring intent. The collection of intent inference modules may be extensible, so modules may be added which either infer more information, or infer similar information in different ways. The system may also be customizable so users can add their own inference rules. The verification system may aggregate the results of all intent inference modules in order to provide a more robust overall understanding.

Figure 6:
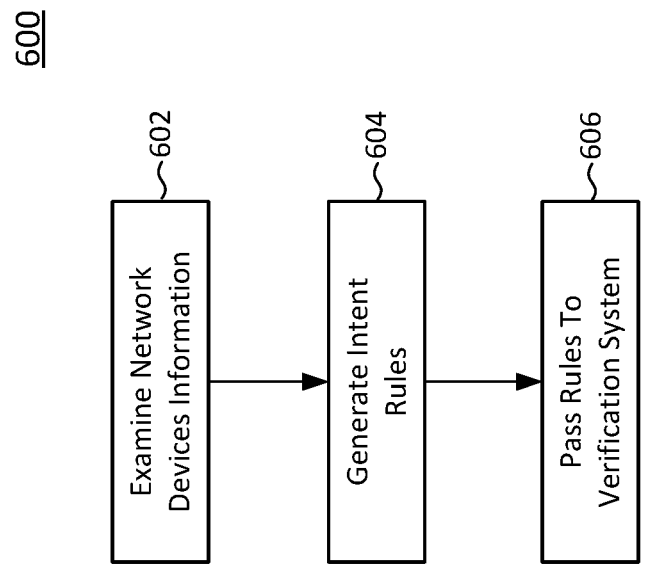
FIG. 6 illustrates a flow chart showing a method of inferring intended behavior of network devices in accordance with an embodiment of the present invention.

FIG. 6 illustrates a flow chart showing a method 600 of inferring intended behavior of network devices in accordance with an embodiment of the present invention. The method 600 of FIG. 6 can be performed in the step 304 of FIG. 3 and/or in the step 112 of FIG. 1. Each individual intent inference module may perform some or all of the steps of the method 600. As shown in FIG. 6, step 602 involves examining labeled objects, along with auxiliary data sources. Step 604 involves creating intent rules, describing desired behavior or configuration of labeled objects, or desired behavior of the broader network involving those objects. Step 606 involves supplying these intent rules to the network verification system using its rule specification formats or interfaces, for subsequent verification.

In the step 606, the particular API or other method through which intent rules are supplied to the verification system may depend on the specific verification system. For example, in U.S. Pat. No. 9,225,601 this is accomplished by writing a graph search algorithm in a C++ API. In other embodiments, this may be accomplished by performing queries to a search API. In work of Fogel et al. (Fogel, Pedrosa, Walraed-Sullivan, Govindan, Mahajan, and Millstein, "A general approach to network configuration analysis", published in USENIX NSDI 2015), this can be accomplished with a declarative language based on Datalog. Other methods could be used. For purposes of illustration, we will describe intent rules in a natural language format—like "Packets received from internet-facing interfaces should never be delivered to management interfaces." It will be understood that such rules can be translated as appropriate for a particular network verification system.

Multi-Tier Data Center Resilience Inference

This module looks for objects labeled by the multi-tier data center object role inference module described above. It then creates rules describing how these labeled objects should behave and how they should carry data between each other. We describe a possible set of these rules oriented to achieve an overall goal of availability and resilience of the data center. This means, at a high level, that devices are connected to each other, that they are connected through multiple paths (in order to protect from failure), and that these multiple paths have consistent behavior. "Multiple path availability" refers to whether there are redundant paths in the network. For example, when traffic flows from device A to device B within the network, there may be multiple paths that it can take. Alternatively, if there is not multiple path availability, all the traffic from device A to device B flows along a single path. In more detail, the system creates the following intent rules. Labeled objects from the role inference step are identified below in italics.

Create rules corresponding to reachability, such as:

For each access layer labeled object A and each virtual local area network (VLAN) identifier V configured on these devices' interfaces, find a neighboring HSRP group labelled object and inspect those HSRP group devices to find their configured virtual IP address X. For each A and V, create an intent rule of the form: "Traffic sent from device A tagged with VLAN V and addressed to X should be able to reach the HSRP group". This address X is important because end-hosts that are part of VLAN V are typically configured to use X as their gateway IP address.

For each core layer labeled object C and each HSRP group H with virtual IP address X, create an intent rule of the form: "Traffic sent from C destined to X should be able to reach H". This rule declares reachability of reverse traffic because the previous rule's gateway reachability alone is not enough to guarantee two way communication.

Create rules corresponding to multiple path availability, such as:

For each access layer labeled object A and each core labeled device C, create an intent rule of the form: "Traffic sent from A should have at least two distinct paths to each core device C, and each of these paths should pass through an HSRP group."

For each pair of distribution layer labeled devices D1, D2 (which may be in different distribution layers), create an intent rule of the form: "If D1 is allowed to reach D2, then traffic sent from D1 to D2 should have at least two distinct paths between them." Distinct paths are paths that do not share a link between devices; some of these paths may be backup paths.

Create rules corresponding to access control consistency. Devices in the network which control access of certain kinds of traffic are referred to as access control devices. Devices such as firewalls fall in this category, and specialize in access control rules, such as blocking certain known malicious IP addresses and so forth; but other device types may have access control rules as well. For redundancy, two access control devices may operate side by side, so that one of them can take over if the other fails. In these cases, it is usually desirable for the access control lists on these devices to be consistent, so that the behavior of the network doesn't change if one such device takes over for the other. Such rules can be generated as follows:

For each interface within any single interface group labeled object, create an intent rule stating these interfaces should have consistent data flow behavior, meaning that "Every packet injected at one interface with a certain IPv4 destination should have the same ultimate fate in the network (point of delivery, or being discarded) as if a packet with the same IPv4 destination were injected at another interface in the group."

For each distribution layer labeled object, create an intent rule that "each trunk interface within the layer should have the same allowed set of VLANs that it can carry."

Create intent rules corresponding to consistency of device configurations, such as:

"For each HSRP group labeled object, exactly one device should be configured as the master."

"For each HSRP group labeled object, the standby should be configured with the IP address of the master and the master should have learned the IP address of the standby."

"For each redundancy group, each device in the redundancy group should have identical configuration except only one should be designated as master."

"For each device which participates in both HSRP and the spanning tree protocol (STP), it should be configured as HSRP master if and only if it is the STP root."

Access Control

This module creates several example intent rules related to segmenting (or isolating) certain parts of the network from each other, or blocking certain kinds of traffic.

Create an intent rule of the form: "Packets received from internet-facing interfaces labeled objects should never be delivered to management interfaces labeled objects." Intuitively, traffic from internet-facing interfaces is considered untrusted, and management interfaces are particularly sensitive since they are the means to control network devices.

Create an intent rule of the form: "Packets received from internet-facing interfaces labeled objects should never be delivered to private server interfaces labeled objects." This reflects the fact that private server interfaces are intended for use within the enterprise only (as discussed above).

Create an intent rule of the form: "Some packets received from internet-facing interfaces labeled objects directed with IP addresses towards access layer labeled devices should be dropped." Intuitively, servers at the access layer should not generally be accessible on all transport port numbers, since some are considered sensitive, so packets sent using those port numbers should be dropped. While this set of restricted ports can vary from network to network, if no packets are dropped, this indicates that no access control rules are present at all, which may indicate a security vulnerability.

First, the module obtains a list of untrusted IP addresses, which may indicate malicious bots, such as from public lists (like the Emerging Threats database; http://doc.emergingthreats.net/) or from commercial vendors that collect and maintain such lists. Create an intent rule of the form: "Packets received from internet-facing interfaces labeled objects with IP source address among those on the untrusted list should be dropped before reaching access layer labeled devices."

Empirical Flow Consistency

Here we disclose a module which (unlike those above) infers intent without using object role inference. Instead, it uses an empirical approach, i.e., observing past behavior.

At a high level, this module uses past possible data flow behavior in the network to infer intended future behavior. However, intended behavior does change over time; for example, hosts are added and removed, dynamically-assigned routes changed, and ports are blocked or unblocked in firewalls. Therefore, we turn to a more robust rule: if two devices have consistent data flow behavior (as defined above) in a certain snapshot of the network, then this module infers that they should be consistent in the future. The module proceeds as follows:

- Note that the network verification system generally collects data from the network across time. One snapshot of this data (such as the most recent at the time the module is first executed) is taken as a "reference snapshot".
- Within the reference snapshot, this module uses the network verification system's model to discover sets of devices that have consistent data flow behavior. To do this, it can incrementally query the model to determine the behavior of a certain type of traffic starting from one device, and a second query to determine the behavior starting from a second device, and compare the results; this can be iterated to determine whether the two devices are fully consistent in their handling of corresponding traffic, and can be iterated across devices to find larger groups of devices which are all consistent. The output of this step is a list of sets S1, S2, S3, . . . , Sk, such that for each i ($1 \leq i \leq k$), Si is a list of devices that have consistent data flow behavior, and each device appears in at most one Si.
- In subsequent snapshots, the module creates an intent rule: "For each set Si, all devices in the set Si should have consistent data flow behavior."

This module may not find all problems, such as if there are errors in the reference snapshot; but it can catch errors that are introduced into the network over time. Periodically, the reference snapshot may be updated, rerunning steps 1-2.

Applications of Intent Inference

The system may use the results of the previous Object Role Inference and Intent Inference stages in several ways.

Intent Verification

The core function of the network verification system is to verify whether the intent is satisfied by the network model. The most immediate use of the Object Role Inference and Intent Inference stages is to feed directly into this verification function by supplying a specification of the intent to be verified (step 306 of FIG. 3).

After the verification system verifies the inferred (and other) intent, the results can be used in a variety of ways. For example, the user can view results of the verification visually; the system can be configured to send notifications of problems (such as intent rules which result in a failed verification) to network monitoring systems; the system can be configured to provide an Accept or Reject notification to a continuous integration system or change control system, thereby allowing a network configuration change to be deployed to the network or prevent it from being deployed, depending on the results of the verification; or the system can be configured to interface programmatically with custom applications.

For example, the user may configure the system to call a custom program when any intent rule related to access control fails. In this potential use of the system, the custom program triggers a logging action in the network to store records of all traffic flowing along paths that were intended to be inaccessible.

System Dashboards and Goal-Directed Overviews

The system collects multiple intent rules together in the service of a particular overall goal for the network or for part of the network. For example, resilience in a data center may be a goal that spans multiple reachability, multipath, and consistency intent rules. The system may provide an overview of this particular goal and an overall numerical score indicating how close the network is to achieving this goal, by considering which constituent intent rules have been successfully verified. This overview may be displayed in a single "dashboard" view of the system's state and verification results. Numerical scores or changes in scores may be configured to trigger actions (e.g. send an alert, or remediate issues in the network in a customizable way, when the score exceeds a user-specified threshold).

Querying

The network management and verification system may offer a means to query the network model to retrieve objects or end-to-end paths that satisfy certain properties. These querying methods can incorporate inferred object roles. For example, the system may be arranged to allow users to query the model to retrieve "all access layer devices", or "paths from access layer devices to internet-facing interfaces". Internally, the system translates these queries using the labeled objects into queries referring to sets of particular objects, and can then execute its existing querying method.

Visualization

The network management and verification system described here has particular applicability to visualization of the network model. Specifically, the results of the object role inference stage can guide visual layout, and annotate objects with their labels.

By way of background, the system may provide visualization of the network model even without the object role inference and intent inference stages. For example, the model may have knowledge of network connectivity, device manufacturers, and so on that can be displayed graphically. Also, in the course of use of the system, users may wish to display the results of intent verification (e.g., a path that is accessible but should not be, or the results of searching the network for a specific kind of possible data flow). However, like other aspects of the network verification system, challenges arise due to the complexity of typical networks. There may be a very large number of visualized objects, and it may be unclear how to graphically arrange them and indicate their purpose or context to the user so that the visualization is useful.

Object role inference as described herein can greatly assist in such visualization, particularly as follows:

- After the system completes object role inference, it can use inferred roles to guide the arrangement of objects in the visualization. Specifically, the system can run a graph layout algorithm supplied with parameters to improve layout, specifying that the graph layout algorithm should:
- For each region, locate objects in that region near each other, and draw a boundary around the region;
- For each group of objects identified as belonging in the same layer together (core, distribution, access, spine, leaf), the graph layout algorithm should place these objects in horizontal alignment so that each layer forms a "row".

When the user interacts with the system's visual user interface, the system may take steps in order to present the user with a "zooming user interface" which displays object role labels as annotations in the visualization, as follows:

When the user initially loads the system, it may show a "zoomed out" view, visualizing the structure of the entire network and how objects are connected to each other with communication links.

The user may then zoom in on a particular area of the network, or the system may zoom in automatically to highlight a particular event selected by the user.

As the zoom progressively increases to focus on a smaller portion of the network, certain types of information may be configured to appear in stages. For example, larger groupings like regions may appear first, followed by narrower groupings like redundancy groups (pairs of devices that work together to provide resilience), followed by details about specific devices' role labels (e.g. core device, access layer device), followed by similar details about interfaces' role labels (e.g. management interface, access interface).

The system may show more specialized visualizations of aspects of the network:

The system may focus on showing a single path through the network and the steps it takes to reach from source to destination. In this visualization, the system can annotate objects along the path with their inferred labels.

The system may show a matrix indicating reachability in the network, i.e., the ability of objects to transmit packets between each other. Each row of this matrix would correspond to a particular object or grouped set of objects, with the rows collectively covering all such objects. Each column in the matrix would similarly correspond to objects or groups thereof. The cell at position (row R, column C) would indicate whether the object corresponding to R can transmit data to the object corresponding to C. For example, the cell may be colored green or red if these objects can or cannot transmit data, respectively. The system can use the inferred grouping and labeling of objects in order to decide how to sort or group nodes in this reachability matrix. This would allow the user to get a high-level overview of which object roles (e.g., access layer, management interfaces, internet-facing interfaces, etc.) have reachability to each other. This allows the user to ignore certain classes of information and focus only on those that would be of particular interest.

Many of the above features and modules can be incorporated into a network visualization system which is not necessarily a network verification system. Consider, for example, a system which collects network state input, stores this in a database form such that state properties of devices may be queried, and provides visualization of the stored network topology and state. Compared to the previously-discussed network verification system, this network visualization system may lack a model of how packets can flow through the network, an understanding of intent, and the means to verify intent. In such a visualization system, object role inference can still be applied to the stored network state information, and the resulting object role labels can be used to enhance the visualization as described above.

Recommending Improvements in the Network

The system may use the inferred object roles and intent to recommend improvements to the network. These improvements may be specific to knowledge of particular kinds of inferred object roles. For example:

When a vPC pair is inferred, the system can check the bandwidth on links downward towards the access layer. If the total of this bandwidth is greater than the bandwidth on the link between the two vPC pair devices, then this indicates a potential performance degradation. In the case that a vPC member port fails, causing hosts to redirect traffic from the primary port to a secondary port; this traffic is then carried over the peer link. So, the system can recommend that the peer link bandwidth is increased to accommodate that potential traffic.

When a core layer is inferred, the system can compare interface utilization rates across the devices in this layer. If it notices constrained bandwidth, it may recommend adding a core layer device, and based on annotations it may suggest how to wire a proposed additional device into surrounding layers of the network.

Figure 7:
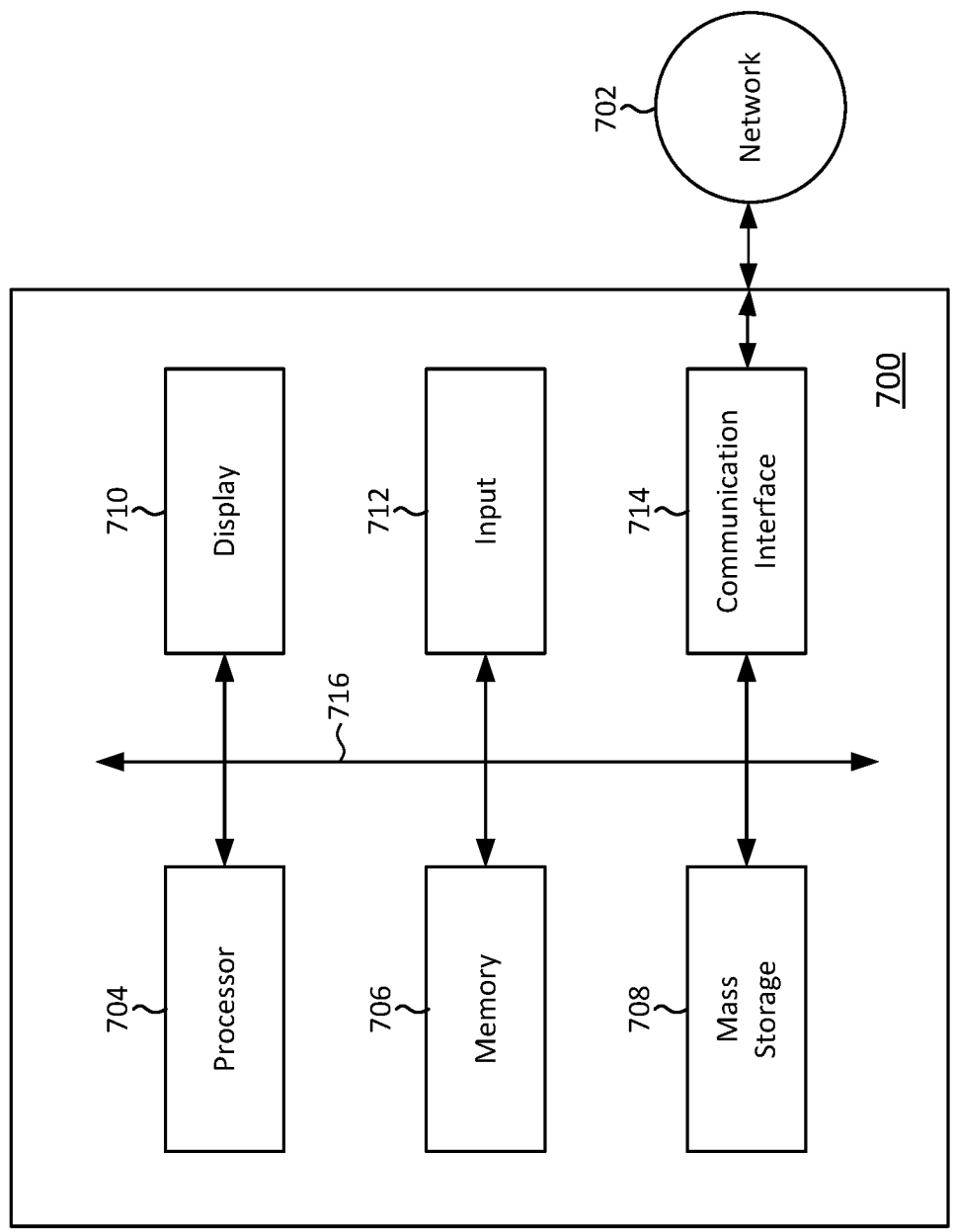
FIG. 7 illustrates a computer system that can be used to execute network verification methods in accordance with an embodiment of the present invention.

FIG. 7 illustrates a computer system 700 that can be used to execute network verification methods in accordance with embodiments of the present invention. Thus, the computer system 700 may represent the network verification system 202 (FIG. 2) or any other computing device referenced herein. The computer system 700 may have stored therein machine-executable instructions that can be executed to cause the computer system 700 to perform any one or more of the methods or computer-based functions disclosed herein. The computer system 700 may operate as a stand-alone device or may be connected to other computer systems or devices via a network 702.

As shown in FIG. 7, the computer system 700 includes a processor 704, a memory 706, mass data storage 708, a display 710, input devices 712, a communication interface 714, which may all be connected to a communication bus 716. Machine executable software programs, applications and/or instructions that are operable to cause the computer system to perform any of the acts or operations described herein may be stored in the memory 706 and/or mass data storage 708. The processor 704 generally executes the software programs, applications and/or instructions from memory 706, however, all or part of the software programs, applications and/or instructions can be stored in the mass storage 708. The mass storage 708 may include a disk drive, flash memory or other type of data storage medium. In addition to storing software programs, applications and/or instructions, the mass storage 708 can be used to store any data that is collected, manipulated and/or generated in connection with any one or more of the methods or computer-based functions disclosed herein.

The display 710 is used to display information to a user and may also receive input from the user (in the case of a touch-screen). Additionally, the computer system 700 may include one or more additional input devices 712, such as a keyboard or mouse for enabling the user to interact with the computer system 700. The computer system 700 may also include a communication interface 714 such as the network device interface that enables communications via the communications network 702. The network 702 may include wired networks, wireless networks, or combinations thereof. The communication interface 714 network may enable communications via any number of communication standards.

It will be apparent that other arrangements of computer systems can be utilized. For example, the computer system can be distributed or cloud-based. Additionally, the methods and systems may also be embedded in a computer program product that includes a non-transient machine-readable storage medium having machine-readable instructions stored thereon, and that, when executed, cause the computer system to carry out operations referenced herein. Accordingly, the methods and systems referenced herein may be realized in hardware or a combination of hardware and software.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A system for managing a network using intent inference, comprising:
   a network interface configured to obtain device information regarding a plurality of hardware devices within a data communication network wherein the device information is obtained by performing one or more of the following:
      sending queries to the devices and receiving responses from the devices;
      monitoring traffic communicated within the data communication network by the devices; and
      sending queries to a database having device information stored therein and receiving responses;
   a processor configured to infer functional roles of the devices by applying role inference rules to the obtained device information and to infer intended packet handling behavior or intended device configuration of the devices by applying intent inference rules to the inferred functional roles of the devices;
   a data storage system in which the inferred functional roles of the devices and the inferred intended packet handling behavior of the devices are stored;
   a network verification system comprising a non-transitory computer-readable storage medium storing instructions that, when executed by at least one processing device, are to:
      determine modeled packet handling behavior of the devices within the data communication network using a computer-implemented model of the data communication network;
      compare the inferred intended packet handling behavior to the modeled packet handling behavior; and
      initiate a configuration change to one or more of the devices in response to said comparison of the inferred intended packet handling behavior to the modeled packet handling behavior.

2. The system according to claim 1, wherein the management system is configured to change packet handling behavior of one or more of the devices in response to said initiation of a configuration change.

3. The system according to claim 1, wherein a system external to the management system is configured to change packet handling behavior of one or more of the devices in response to said initiation of a configuration change.

4. The system according to claim 1, wherein the processor is configured to: examine object information regarding a plurality of objects of the data communication network, apply role inference rules to the obtained object information to determine the roles of objects in the data communication network, and create labels associating objects with the identified roles.

5. The system according to claim 4, wherein the processor is further configured to apply a confidence level to the labels.

6. The system according to claim 4, wherein the data communication network comprises a multi-tier layered network and said applying role inference rules comprises:
   identifying and labelling interfaces in the data communication network;
   identifying and labelling device types in the data communication network;
   identifying and labelling access devices in the data communication network; and
   identifying and labelling access layers in the data communication network.

7. The system according to claim 4, wherein said applying role inference rules further comprises identifying and labelling redundancy groups.

8. The system according to claim 4, wherein said identifying and labelling interfaces comprises identifying physical ports at the edge of the data communication network.

9. The system according to claim 1, wherein the data communication network comprises a leaf-spine network and said applying role inference rules comprises inferring roles of devices within the leaf-spine network.

10. The system according to claim 1, wherein said applying role inference rules comprises inferring roles from network traffic.

11. The system according to claim 1, wherein said applying role inference rules comprises inferring network regions.

12. The system according to claim 1, wherein said applying role inference rules employs machine learning to classify objects into roles.

13. The system according to claim 1, wherein the processor is configured to obtain device information from a model for inferring functional roles of the devices.

14. The system according to claim 1, wherein said intent inference rules comprise one or more of the following: a reachability rule; a multiple path availability rule; an access control consistency rule; a data flow consistency rule; a device configuration consistency rule; and a network segmentation rule.

15. The system according to claim 1, wherein the processor is configured to obtain device information from a model for inferring intended packet handling behavior of the devices.

16. The system according to claim 1, wherein the network management system is configured to display graphically a depiction of the data communication network.

17. The system according to claim 1, wherein the network management system is configured to display graphically one or more paths in the data communication network.

18. The system according to claim 1, wherein the network verification system is configured to display graphically results of said comparison of the inferred intended packet handling behavior to the modeled packet handling behavior.

19. The system according to claim 18, wherein the network verification system is configured to display graphically at least a portion of the data communication network for which the modeled packet handling behavior is not consistent with the inferred intended packet handling behavior.

20. The system according to claim 1, wherein the intended behavior comprises actual intended behavior as input by a user.

21. The system according to claim 1, wherein the intent inference rules include at least one rule that is user-selectable or user-modifiable.

22. A system for managing a network using intent inference, comprising:
   a network interface configured to obtain device information from a plurality of hardware devices within a data communication network wherein the device information is obtained by performing one or more of the following:
      sending queries to the devices and receiving responses from the devices; and monitoring traffic communicated within the data communication network by the devices;

a processor in network communication with the devices via the network interface, wherein the processor is configured to infer functional roles of the devices by applying role inference rules to the obtained device information and to infer intended packet handling behavior or intended device configuration of the devices by applying intent inference rules to the inferred functional roles of the devices;

a data storage system in which the inferred functional roles of the devices and the intended packet handling behavior of the devices are stored; and a network verification system comprising a non-transitory computer-readable storage medium storing instructions that, when executed by at least one processing device, are to:

determine modeled packet handling behavior of the devices within the data communication network using a computer-implemented model of the data communication network; and compare the intended packet handling behavior to the modeled packet handling behavior; and store results of said comparison in a database.

23. The system according to claim 22, wherein the system is configured to provide an accept or reject notification in response to said comparison of the inferred intended packet handling behavior to the modeled packet handling behavior, thereby allowing a network configuration change to be deployed to the data communication network or prevent it from being deployed, depending on the results of said comparison.

24. The system according to claim 22, wherein the system is configured to recommend a change to the data communication network when the modeled packet handling behavior is not consistent with the inferred intended packet handling behavior, or when device configurations are not consistent with inferred intended configurations.

25. The system according to claim 22, wherein the management system is configured to change packet handling behavior of one or more of the devices in response to initiation of a configuration change.

26. The system according to claim 22, wherein a system external to the management system is configured to change packet handling behavior of one or more of the devices in response to initiation of a configuration change.

27. The system according to claim 22, wherein the processor is configured to: examine object information regarding a plurality of objects of the data communication network, apply role inference rules to the obtained object information to determine the roles of objects in the data communication network, and create labels associating objects with the identified roles.

28. The system according to claim 27, wherein the processor is further configured to apply a confidence level to the labels.

29. The system according to claim 22, wherein the data communication network comprises a multi-tier layered network and said applying role inference rules comprises:

identifying and labelling interfaces in the data communication network;

identifying and labelling device types in the data communication network; and identifying and labelling layers of devices with related functionality within the data communication network.

30. The system according to claim 29, wherein said identifying and labelling interfaces comprises identifying physical ports at the edge of the data communication network.

31. The system according to claim 22, wherein said applying role inference rules further comprises identifying and labelling redundancy groups.

32. The system according to claim 22, wherein the data communication network comprises a leaf-spine network and said applying role inference rules comprises inferring roles of devices within the leaf-spine network.

33. The system according to claim 22, wherein said applying role inference rules comprises inferring roles from network traffic.

34. The system according to claim 22, wherein said applying role inference rules comprises inferring network regions.

35. The system according to claim 22, wherein said applying role inference rules employs machine learning to classify objects into roles.

36. The system according to claim 22, wherein the processor is configured to obtain device information from a model for inferring functional roles of the devices.

37. The system according to claim 22, wherein said intent inference rules comprise one or more of the following: a reachability rule; a multiple path availability rule, an access control consistency rule; a data flow consistency rule; a device configuration consistency rule; and a network segmentation rule.

38. The system according to claim 22, wherein the processor is configured to obtain device information from a model for inferring intended packet handling behavior of the devices.

39. The system according to claim 22, wherein the network management system is configured to display graphically a depiction of the data communication network.

40. The system according to claim 22, wherein the network management system is configured to display graphically one or more paths in the data communication network.

41. The system according to claim 22, wherein the network verification system is configured to display graphically the results of said comparison of the inferred intended packet handling behavior to the modeled packet handling behavior.

42. The system according to claim 41, wherein the network verification system is configured to display graphically at least a portion of the data communication network for which the modeled packet handling behavior is not consistent with the inferred intended behavior.

43. The system according to claim 22, wherein the intended behavior comprises actual intended behavior as input by a user.

44. The system according to claim 22, wherein the intent inference rules include at least one rule that is user-selectable or user-modifiable.

45. A system for managing a network using intent inference, comprising:

a network interface configured to obtain device information from a plurality of hardware devices within a data communication network wherein the device information is obtained by performing one or more of the following:

sending queries to the devices and receiving responses from the devices; and monitoring traffic communicated within the data communication network by the devices;

a processor in network communication with the devices via the network interface, wherein the processor is configured to infer intended packet handling behavior or intended configurations of the devices by applying intent inference rules to the obtained device information;

a data storage system in which the device information and the inferred intended packet handling behavior of the devices are stored; and a network verification system comprising a non-transitory computer-readable storage medium storing instructions that, when executed by at least one processing device, are to:

determine modeled packet handling behavior of the devices within the data communication network using a computer-implemented model of the data communication network;

compare the inferred intended packet handling behavior to the modeled packet handling behavior; and initiate a configuration change to one or more of the devices in response to said comparison of the inferred intended packet handling behavior to the modeled packet handling behavior.

46. The system according to claim 45, wherein the processor is configured to infer intended packet handling behavior by applying intent inference rules to information obtained from monitoring traffic communicated within the data communication network, thereby inferring intended packet handling behavior from monitored packet handling behavior.

47. A system for managing a network using intent inference, comprising:

a network interface configured to obtain device information regarding a plurality of hardware devices within a data communication network wherein the device information is obtained by performing one or more of the following:

sending queries to the devices and receiving responses from the devices;

monitoring traffic communicated within the data communication network by the devices; and sending queries to a database having device information stored therein and receiving responses;

a processor configured to infer functional roles of the devices by applying role inference rules to the obtained device information;

a data storage system in which the inferred functional roles of the devices and inferred intended packet handling behavior of the devices are stored;

a network visualization system comprising a non-transitory computer-readable storage medium storing instructions that, when executed by at least one processing device, are to:

determine modeled packet handling behavior of the devices within the data communication network;

compare the intended packet handling behavior to the modeled packet handling behavior;

store results of said comparison in a database; and display graphically a depiction of the devices within the data communication network and one or more paths connecting the devices within the data communication network.

48. A method of managing a network using intent inference, comprising steps of:

obtaining device information from a plurality of hardware devices within a data communication network via a network interface by performing one or more of the following:

sending queries to the devices and receiving responses from the devices;

monitoring traffic communicated within the data communication network by the devices; and sending queries to a database having device information stored therein and receiving responses;

inferring functional roles of the devices by applying role inference rules to the obtained device information using a processor in network communication with the devices via the network interface;

inferring intended packet handling behavior of the devices by applying intent inference rules to the inferred functional roles of the device using the processor;

storing the inferred functional roles of the devices and the inferred intended packet handling behavior in data storage;

modeling packet handling behavior of the devices within the data communication network to determine modeled packet handling behavior using a computer-implemented network model;

comparing the inferred intended packet handling behavior to the modeled packet handling behavior; and initiating a configuration change to one or more of the devices of the data communication network in response to said comparing the inferred intended packet handling behavior to the modeled packet handling behavior.

* * * * *